UNITED STATES PATENT OFFICE.

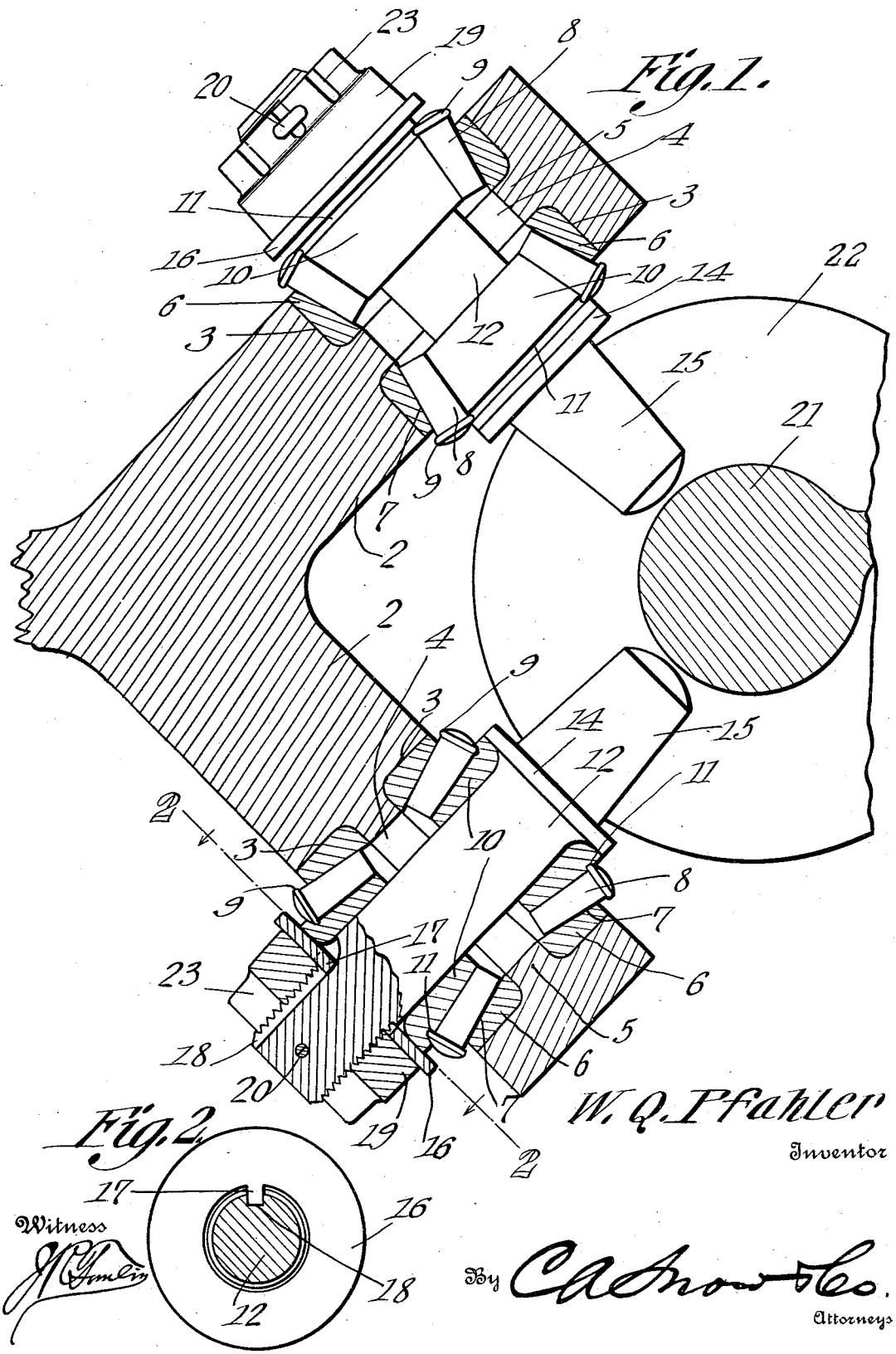

WILLIAM Q. PFAHLER, OF TOLEDO, OHIO.

ROLLING TOOTH FOR WORM-WHEELS.

1,297,238.  Specification of Letters Patent.  Patented Mar. 11, 1919.

Application filed September 24, 1918. Serial No. 255,455.

*To all whom it may concern:*

Be it known that I, WILLIAM Q. PFAHLER, a citizen of the United States, residing at Toledo, in the county of Lucas and State of Ohio, have invented a new and useful Rolling Tooth for Worm-Wheels, of which the following is a specification.

The device forming the subject matter of this application is a wormwheel having a rotatable tooth and the invention aims to provide novel means for mounting the tooth, so that the same may be supported by an anti-friction bearing.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 is a section taken through a portion of a wormwheel and a worm, parts of the structure appearing in elevation; and Fig. 2 is a section on the line 2—2 of Fig. 1.

The numeral 1 denotes a wormwheel having diverging laterally extended flanges 2 provided in their opposed faces with recesses 3, the recesses 3 being connected by a reduced passage 4 defining an annular rib 5. Outer rings 6 are located in the recesses 3 and abut at their adjacent ends against the rib 5. The rings 6 have conical bearing surfaces 7 coöperating with tapered rollers 8 or with anti-friction element of any desired sort. The rollers 8 are supplied with heads 9. Inner rings 10 coöperate with the rollers 8 and are supplied with circumferential grooves 11 receiving the edges of the heads 9 of the rollers 8.

A tooth 12 extends through the inner rings 10 and is provided with a flange 14 which engages one of the rings 10. The tooth terminates in a conical tip 15. A washer 16 is mounted on one end of the tooth 12 and has a tongue 17 received in a longitudinal slot 18 formed in the butt of the tooth 12. A castle nut 19 is threaded on the butt of the tooth 12 and is held in place by a cotter pin 20 received in the slots 23 of the castle nut.

The numeral 21 denotes a shaft carrying a worm 22 wherewith the teeth 12 of the wormwheel 1 coöperate.

In practical operation, the castle nut 19 may be tightened up on the butt of the tooth 12, the washer 17 engaging one of the inner rings 10, and the other inner ring being engaged by the flange 14, the nut being held in place by means of the cotter pin 20. It will be obvious that a simple but efficient means is provided whereby the tooth 12 will be supported anti-frictionally, so that the tip 15 of the tooth will coöperate with the worm 22.

Having thus described the invention, what is claimed is:—

1. In a device of the class described, a wormwheel having a laterally extended flange provided on its opposite sides with recesses, and having an internal shoulder separating the recesses; anti-friction bearings in the recesses and engaged with the shoulder; a rotatable tooth extended through the bearings and having a flange engaging one bearing; a washer on the tooth and engaging the other bearing, the washer having a tongue, and the tooth having a slot receiving the tongue; a castle nut threaded on the tooth and coöperating with the washer; and a pin in the tooth, the pin engaging the castle nut.

2. In a device of the class described, a wormwheel having a laterally extended flange provided on its opposite sides with recesses, and having an internal shoulder separating the recesses; outer rings in the recesses and engaged with the shoulder; a rotatable tooth having a flange; inner rings on the tooth, one inner ring being engaged by the flange; anti-friction devices between the rings; and adjustable means on the tooth, for engaging the other inner ring.

In testimony that I claim the foregoing as my own, I have hereto affixed my signature in the presence of two witnesses.

WILLIAM Q. PFAHLER.

Witnesses:
 H. G. WAGNER,
 SHERMAN W. LOTT.